(12) United States Patent
Soo (10) Patent No.: US 9,048,593 B2
(45) Date of Patent: Jun. 2, 2015

(54) ELECTRONIC CARD CONNECTOR

(75) Inventor: Foong-Ching Soo, Singapore (SG)

(73) Assignee: Molex Incorporated, Lisle, IL (US)

( * ) Notice: Subject to any disclaimer, the term of this patent is extended or adjusted under 35 U.S.C. 154(b) by 133 days.

(21) Appl. No.: 13/700,164

(22) PCT Filed: May 25, 2011

(86) PCT No.: PCT/US2011/037921
§ 371 (c)(1),
(2), (4) Date: Feb. 13, 2013

(87) PCT Pub. No.: WO2011/150072
PCT Pub. Date: Dec. 1, 2011

(65) Prior Publication Data
US 2013/0210280 A1      Aug. 15, 2013

(30) Foreign Application Priority Data

May 27, 2010  (SG) .................................. 201003711

(51) Int. Cl.
*H01R 12/71* (2011.01)
*G06K 7/00* (2006.01)
*H01R 4/02* (2006.01)
*H01R 13/24* (2006.01)

(52) U.S. Cl.
CPC .............. *H01R 12/71* (2013.01); *G06K 7/0021* (2013.01); *H01R 4/02* (2013.01); *H01R 13/2442* (2013.01)

(58) Field of Classification Search
CPC ............. H01R 13/2442; H01R 23/722; H01R 23/7073; H01R 23/02; H01R 23/725; H01R 27/00; H01R 12/57; H01R 9/096; H01R 13/2435; G06K 7/0021
USPC ............................................ 439/660, 862, 66
See application file for complete search history.

(56) References Cited

U.S. PATENT DOCUMENTS

| 4,687,268 | A | | 8/1987 | Picciotto et al. |
| 5,052,942 | A | | 10/1991 | Rauterberg et al. |
| 5,980,323 | A | | 11/1999 | Bricaud et al. |
| 6,120,328 | A | * | 9/2000 | Bricaud et al. ............... 439/630 |
| 6,129,558 | A | | 10/2000 | Kihira et al. |
| 7,090,546 | B2 | * | 8/2006 | Zheng et al. ................. 439/862 |
| 7,481,686 | B2 | * | 1/2009 | Uchida et al. ................ 439/862 |
| 7,955,135 | B2 | * | 6/2011 | Wang et al. .................. 439/630 |
| 2003/0211783 | A1 | | 11/2003 | Matsunaga et al. |
| 2005/0130499 | A1 | | 6/2005 | Zheng et al. |

(Continued)

FOREIGN PATENT DOCUMENTS

CN    201285850       5/2009
EP    1 244 178 A2    9/2002

OTHER PUBLICATIONS

International Search Report for PCT/US2011/037921.

*Primary Examiner* — Gary Paumen
(74) *Attorney, Agent, or Firm* — Stephen L. Sheldon (57) ABSTRACT

An electronic card connector comprises an insulating body defining a bottom surface and a top surface opposite to the bottom surface, and a plurality of terminals contained in the insulating body. Each terminal comprises a base comprising a main portion, a spring portion extending from the base, a contact portion extending from the spring portion to outside of the insulating body, a first soldering portion recessed in a first end of the base and a second soldering portion separated from the first soldering portion. The first soldering portion and the main portion form a slit therebetween.

14 Claims, 11 Drawing Sheets

(56) References Cited

U.S. PATENT DOCUMENTS

| | | |
|---|---|---|
| 2005/0130510 A1* | 6/2005 | Zheng et al. ............. 439/862 |
| 2007/0134989 A1 | 6/2007 | Yang et al. |
| 2010/0062620 A1* | 3/2010 | Lei et al. ............. 439/66 |
| 2012/0108110 A1* | 5/2012 | Li ............. 439/660 |

* cited by examiner

FIG. 11

ELECTRONIC CARD CONNECTOR

RELATED APPLICATIONS

This application is a national phase of PCT Application No. PCT/US2011/37921, filed May 25, 2011 which claims priority to Singapore Application No. 201003711-7, filed May 27, 2010, which is incorporated herein by reference in its entirety.

FIELD OF THE INVENTION

The present invention relates to an electronic card connector, and more particularly, to an electronic card connector that can be fixed in a stable manner on a PCB.

DESCRIPTION OF THE RELATED ART

One type of electronic card connectors includes an insulating body integrated with terminals each having a contacting part for engaging an electronic card and a lead configured to be soldered to a contact pad on a printed circuit board for electrical engagement with the printed circuit board. Usually, such an electronic connector is fixed to the printed circuit board via the solder connections between the leads and the contact pads on the printed circuit board. However, due to the low mechanical strength of solder connections, the solder connections may be broken after an electronic card is inserted and removed several times. Therefore, reinforcing leads for increasing the connection strength between the electronic card connector and the printed circuit board are usually provided.

Figure 1:
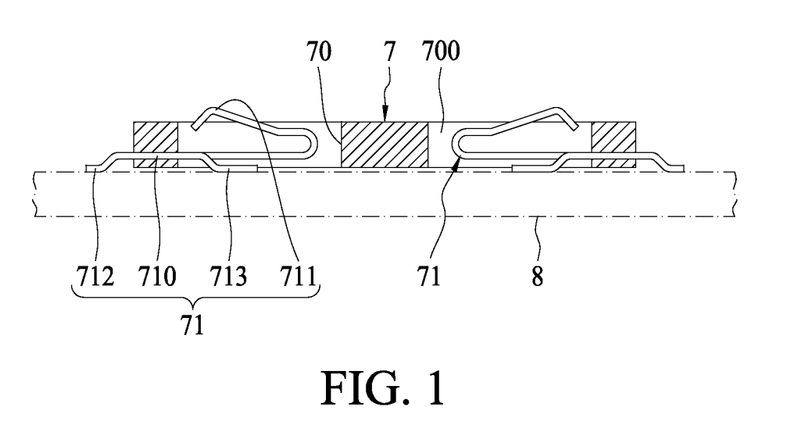
FIG. 1 is a perspective view showing a conventional electronic card connector.

As shown in FIG. 1, U.S. Pat. No. 6,129,558 discloses an electronic card connector 7 comprising a plurality of terminals 71, each of which includes a reinforcing lead 713 disposed for increasing the connection strength between the electronic card connector 7 and the printed circuit board. The reinforcing lead 713 is bent and then extends along the printed circuit board so as to allow it to be soldered on the printed circuit board. However, the reinforcing lead 713 with such a configuration needs large printed circuit board area so as to obtain sufficient connection strength.

Figure 2:
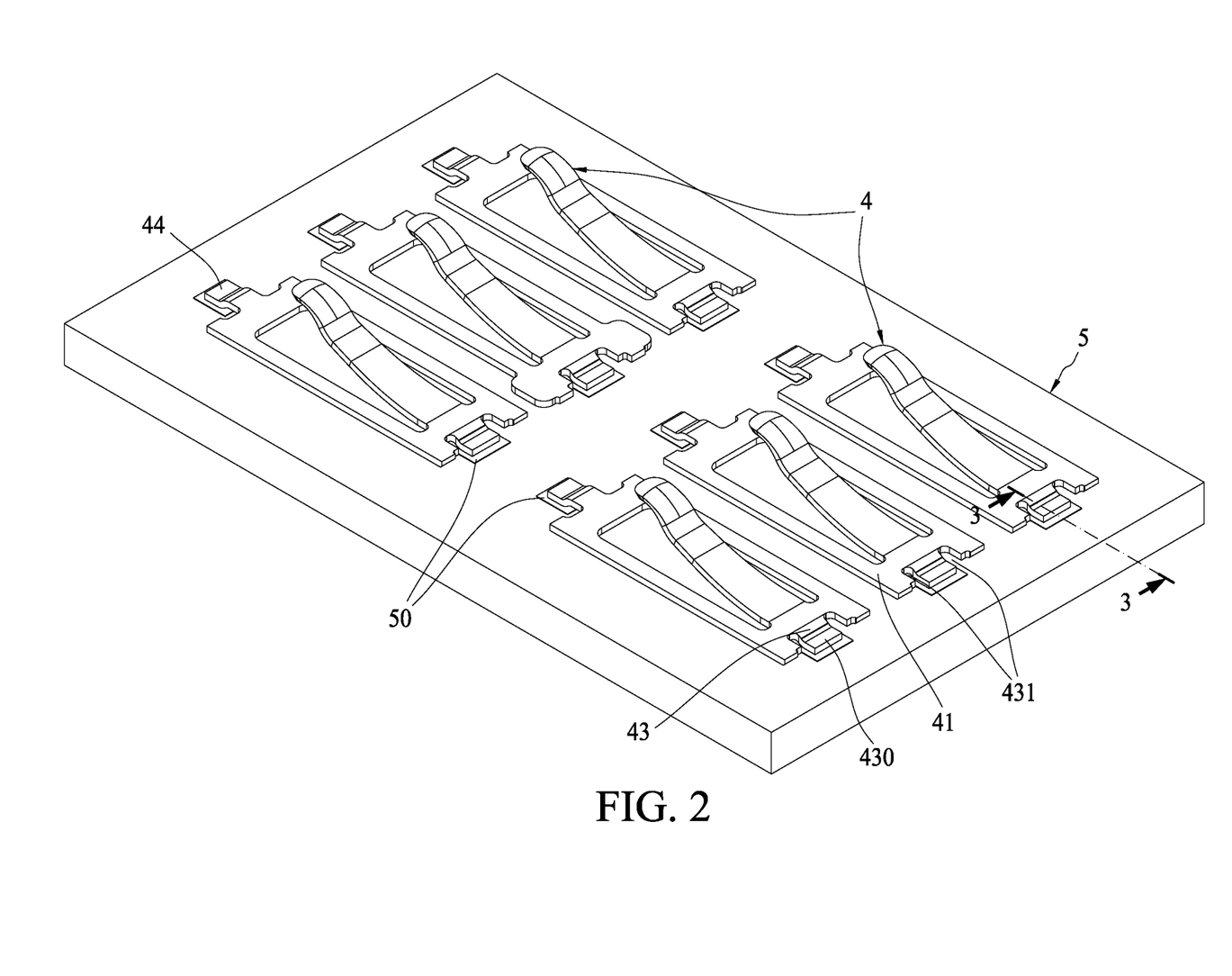
FIG. 2 is a perspective view showing a plurality of terminals of an electronic card connector according to a conventional design mounted on a PCB.
Figure 3:
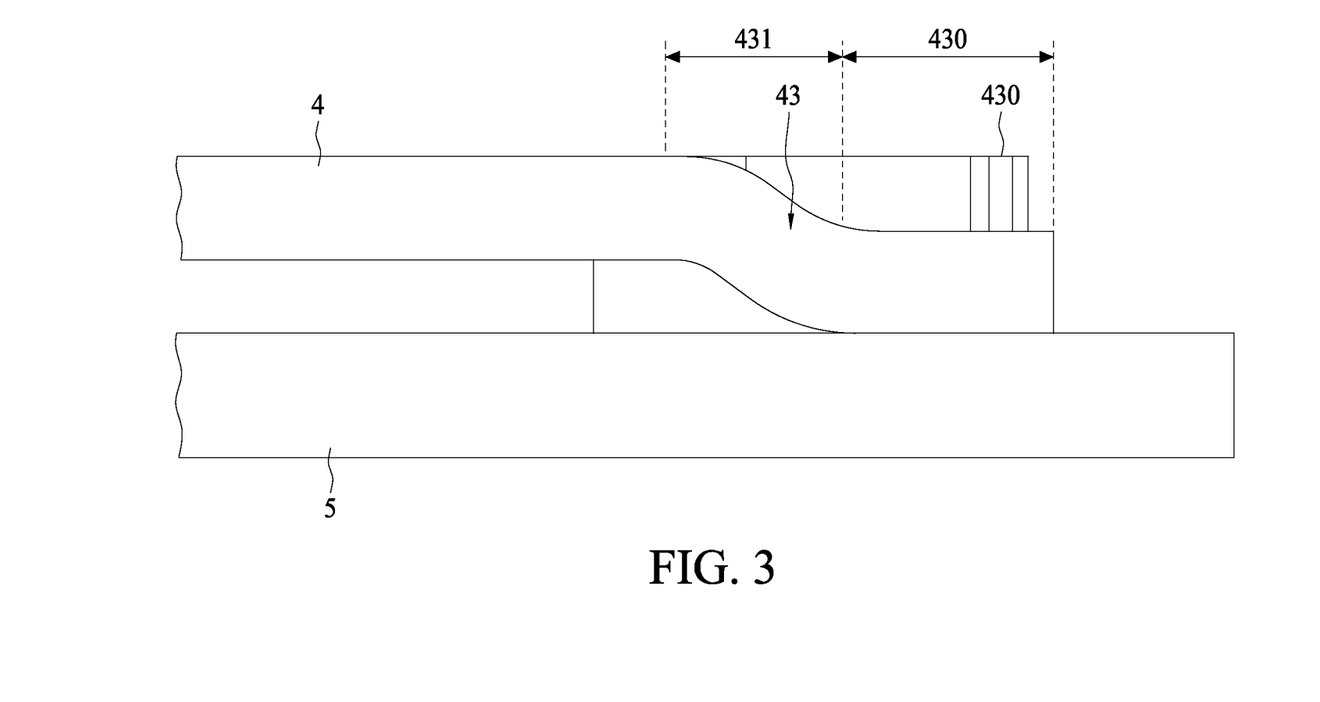
FIG. 3 is a cross-sectional view along line 3-3 of FIG. 2.

FIGS. 2 and 3 show another conventional electronic card connector 4. The electronic card connector 4 includes a plurality of terminals 4 closely arrayed on the printed circuit board 5. Each terminal 4 includes a first soldering portion 43 and a second soldering portion 44 disposed opposite to each other. Because the terminals 4 are closely arrayed, the area surrounding the terminals 4 is limited. The first soldering portion 43 and the second soldering portion 44 are bent and then extend, formed similarly to the reinforcing lead 713 of the terminal 71 in U.S. Pat. No. 6,129,558. Due to limited surrounding area, the first soldering portion 43 and the second soldering portion 44 cannot extend to have sufficient solderable area, resulting in insufficient connection strength. To obtain sufficient connection strength, the distances between the terminals 4 must be increased to allow the first soldering portion 43 and the second soldering portion 44 to sufficiently extend. However, such an arrangement may increase the size of the electronic card connector 4, not acceptable to customers who need compact design.

In addition, as shown in FIG. 3, the first soldering portion 43 including a flat soldering plate 430 configured to be soldered on a contact pad on a printed circuit board is bent so that the flat soldering plate 430 can contact the contact pad. The bent section 431 that cannot be soldered occupies a significant portion of the first soldering portion 43, eliminating a large portion of the possible solderable area of the flat soldering plate 430.

Furthermore, as shown in FIG. 2, the first soldering portion 43 extends from the main portion 41 of the terminal 4 and is separated from the main portion 41 by two gaps 431. However, the gaps 431 further reduce the solderable area of the first soldering portion 43, restricting the increase of the strength of attachment of the electronic card connector 4.

Based on the above, certain individuals would appreciate improvements to electronic card connectors.

SUMMARY OF THE INVENTION

In one embodiment, an electronic card connector can be provided that comprises an insulating body defining a bottom surface and a top surface opposite to the bottom surface, and a plurality of terminals contained in the insulating body. Each terminal comprises a base comprising a main portion; a spring portion extending from the base; a contact portion extending from the spring portion to outside of the insulating body; a first soldering portion recessed in a first end of the base, wherein the first soldering portion and the main portion form a slit therebetween; and a second soldering portion is separated from the first soldering portion. In an embodiment, the second soldering portion is recessed in a second end opposite to the first end of the base, wherein the second soldering portion and the main portion form a slit therebetween. In another embodiment, the second soldering portion extends downward from the main portion in a second end opposite to the first end of the base. One edge of the first soldering portion and the second soldering portion can be exposed so as to increase solderable area. The main portion of the terminal can be formed in the insulating body by insert molding, defining a window in the middle thereof, and the spring portion extends from an end of the main portion near the first end of the base over the window. Corresponding to the first soldering portion of the terminal, the insulating body defines an opening. Corresponding to the window of the main portion, the insulating body defines a passageway through the bottom surface to the top surface; and the spring portion of the terminal extends in the passageway correspondingly. The bottom surface of the available soldering part of the first soldering portion, the bottom surface of the available soldering part of the second soldering portion, and the bottom surface of the insulating body are substantially coplanar. The available soldering part of the first soldering portion is a flat soldering plate lanced in the middle, and the available soldering part of the second soldering portion is a flat soldering plate in the free end of the second soldering portion. In one embodiment, the electronic card connector is a SIM card connector.

BRIEF DESCRIPTION OF THE DRAWINGS

Other objects, advantages and novel features of the invention will become more apparent from the following detailed description when read in conjunction with the accompanying drawings in which features will be described according to the appended drawings.

DETAILED DESCRIPTION OF THE INVENTION

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

A benefit of the depicted embodiment is to provide an electronic card connector, which has a large solderable pad area so that the electronic card connector can be firmly secured. Additional benefits can be appreciated from the disclosure that follows.

Figure 4:
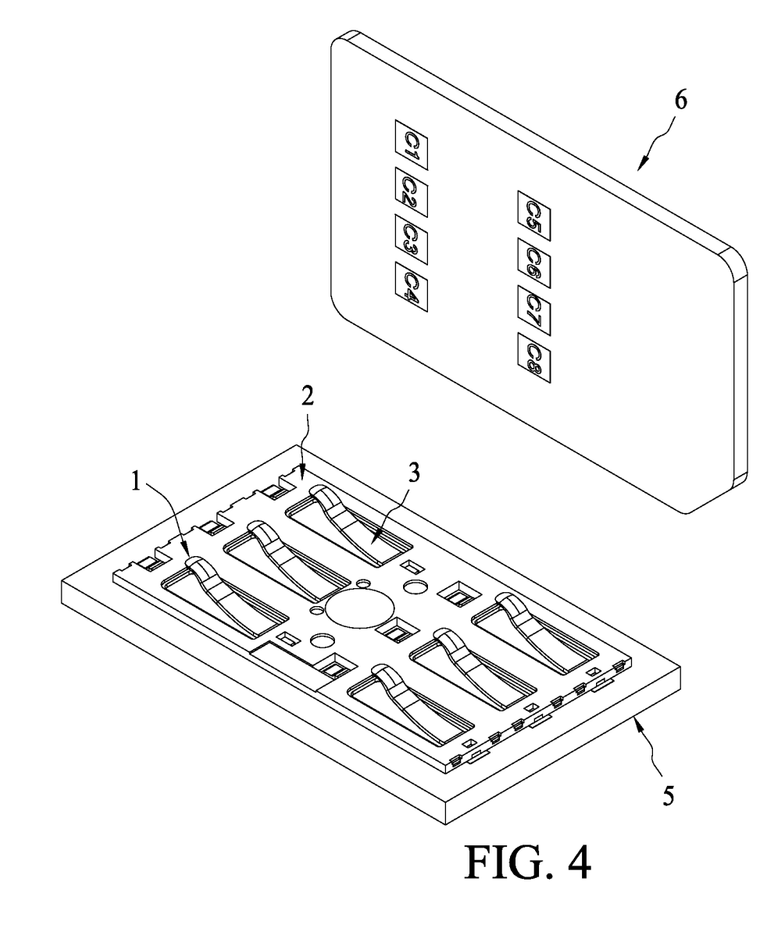
FIG. 4 is a perspective view showing an embodiment of an electronic card connector which is mounted on a PCB to mate with a SIM card.

FIG. 4 demonstrates an embodiment of an electronic card connector 1. As shown in FIG. 4, the electronic card connector 1 in the present embodiment is a SIM card connector comprising an insulating body 2, and a plurality of terminals 3 insert molded with the insulating body 2. The electronic connector 2 is fixed to a PCB 5 to mate with a SIM card 6.

Figure 5:
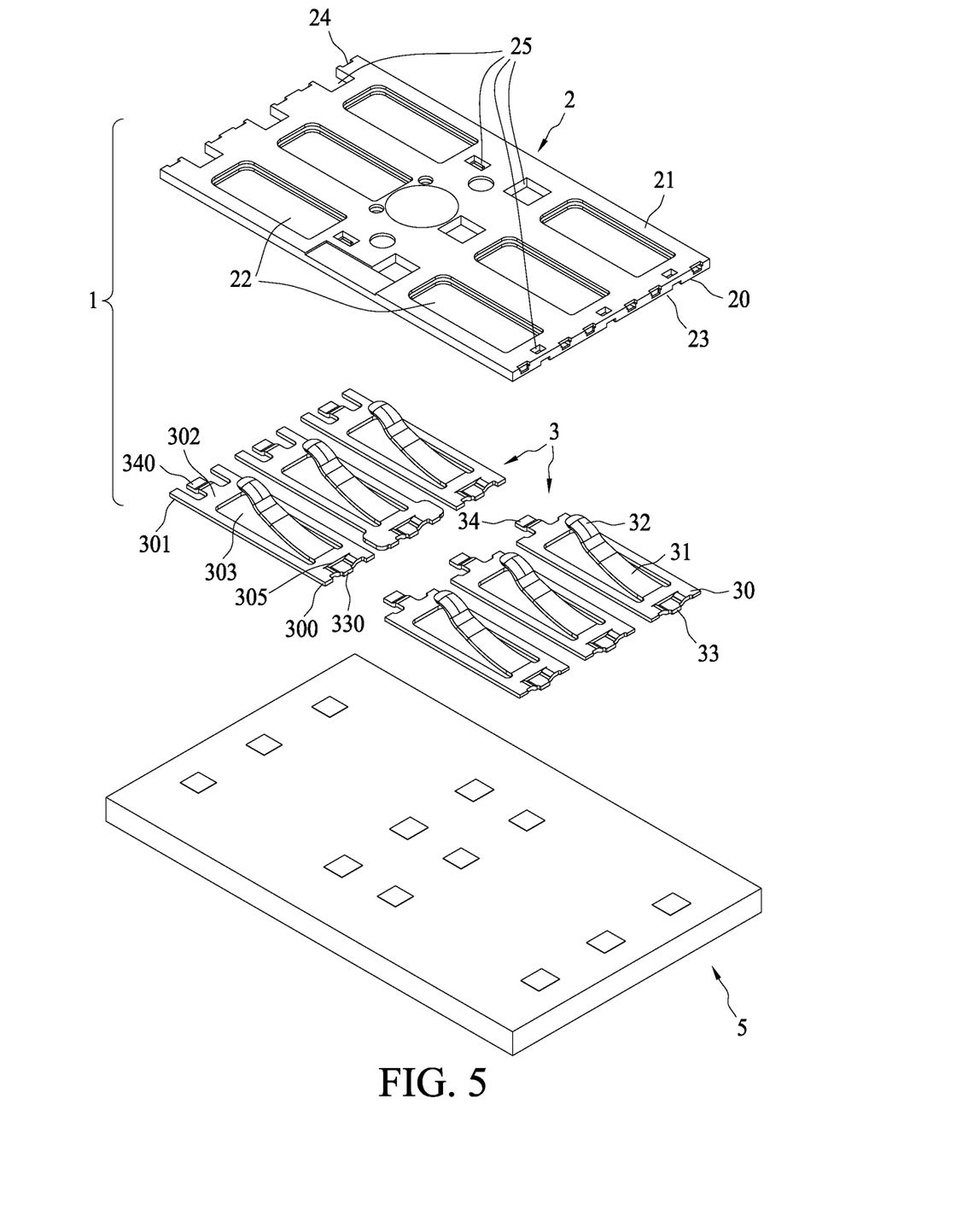
FIGS. 5 and 6 are schematic views showing an embodiment of an arrangement of a molded insulating body, a plurality of terminals, and a printed circuit board.
Figure 6:
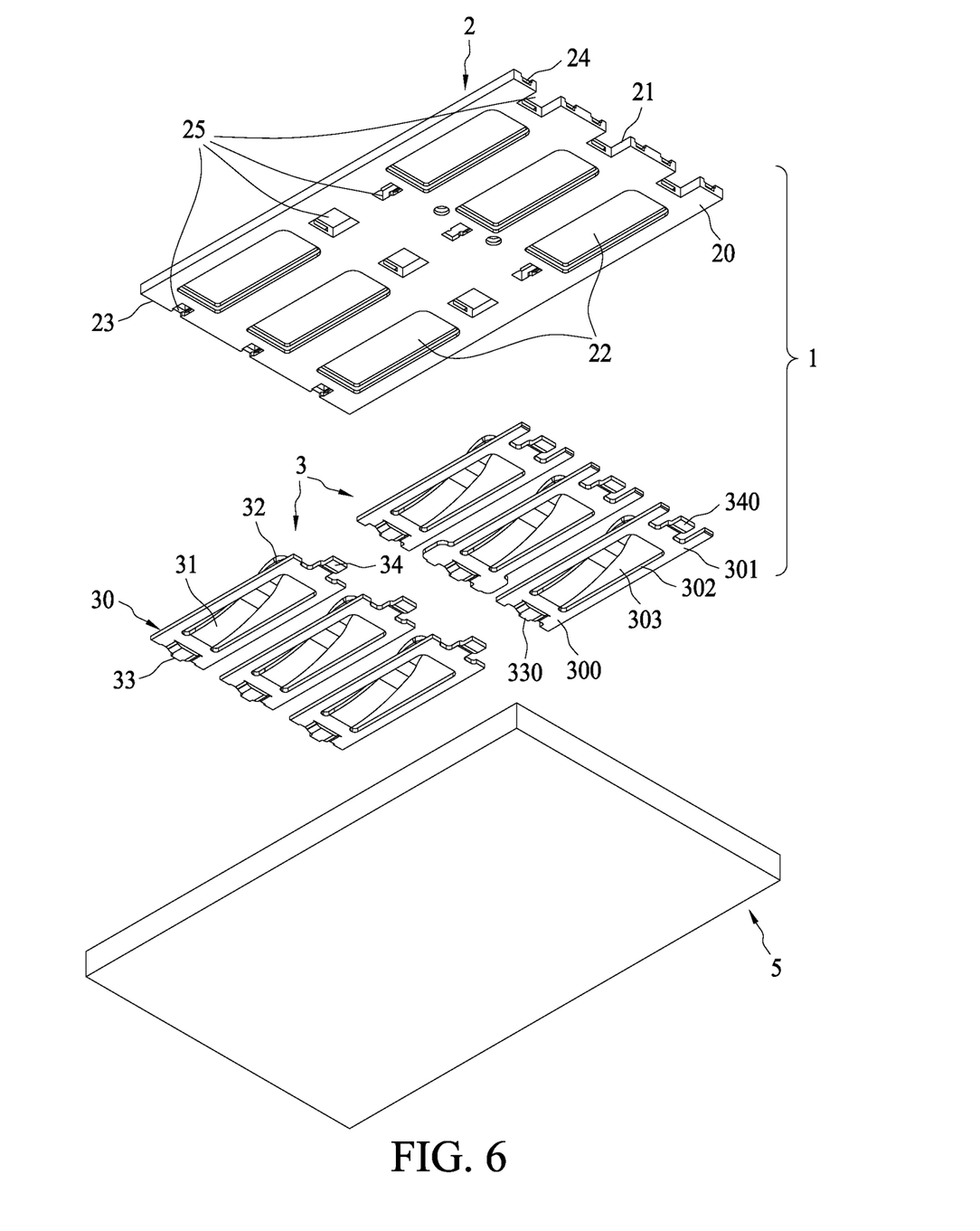
Figure 7:
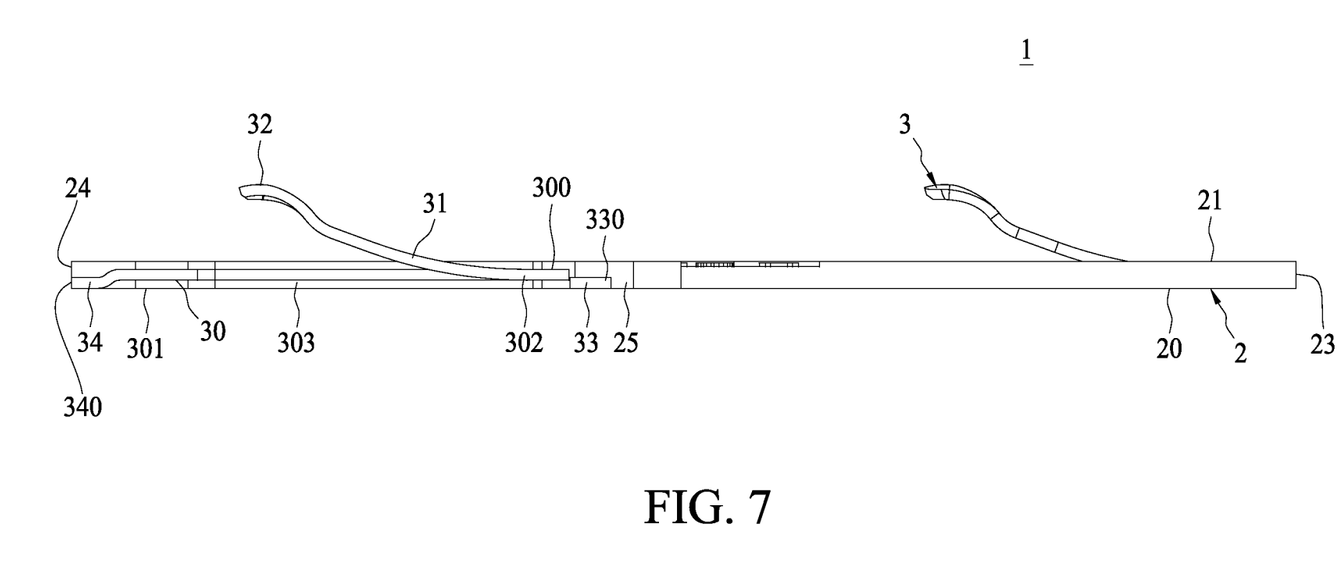
FIG. 7 is a partially exploded side-view showing an embodiment of an electronic card connector.

FIGS. 5 and 6 are schematic views showing an arrangement of a molded insulating body, a plurality of terminals, and a printed circuit board. FIG. 7 is a partially exploded side view showing an embodiment of an electronic card connector 1. Referring to FIGS. 5, 6, and 7, the insulating body 2 has a rectangular shape, including a bottom surface 20, a top surface 21 opposite to the bottom surface 20, and a plurality of passageways 22 through the bottom surface 20 to the top surface 21 and extending in a direction along the length of the insulating body 2. Specifically, when the electronic card connector 1 is fixed on a PCB 5, the bottom surface 20 is a surface of the insulating body 2 facing the PCB 5. The plurality of passageways 22 is arranged in two rows in a direction of the length of the insulating body 2. That is, a first row of a passageway 22 is arranged near a first end 23 of the insulating body 2, and a second row of a passageway 22 is arranged near a second end 24 of the insulating body 2.

Each terminal 3 comprises a base 30, a spring portion 31 extending from the base 30, a contact portion 32 extending from the distal end of the spring portion 31, a first soldering portion 33, and a second soldering portion 34 separated from the first soldering portion 33. The base 30 includes a first end 300, a second end 301 opposite to the first end 300, and a main portion 302. The main portion 302 has a window 303 in the middle disposed corresponding to one passageway 22 of the insulating body 2. The spring portion 31 extends upward from an end of the main portion 302 near the first end 300 and over the window 303. The first soldering portion 33 is formed by recessing a portion of the first end 300 of the base 30, wherein the first soldering portion 33 and the main portion 302 form a slit 305 therebetween. Specifically, the first soldering portion 33 is formed by lancing downward the central portion of the first end 300, so as to obtain a flat soldering plate 330 in the middle of the first soldering portion 33. The slit 305 extends in a direction of the width of the insulating body 2. The second soldering portion 34 extends downward from and away from the main portion 302 in the second end 301 of the base 30, and forms a flat soldering plate 340 in the free end of the second soldering portion 34.

Figure 8:
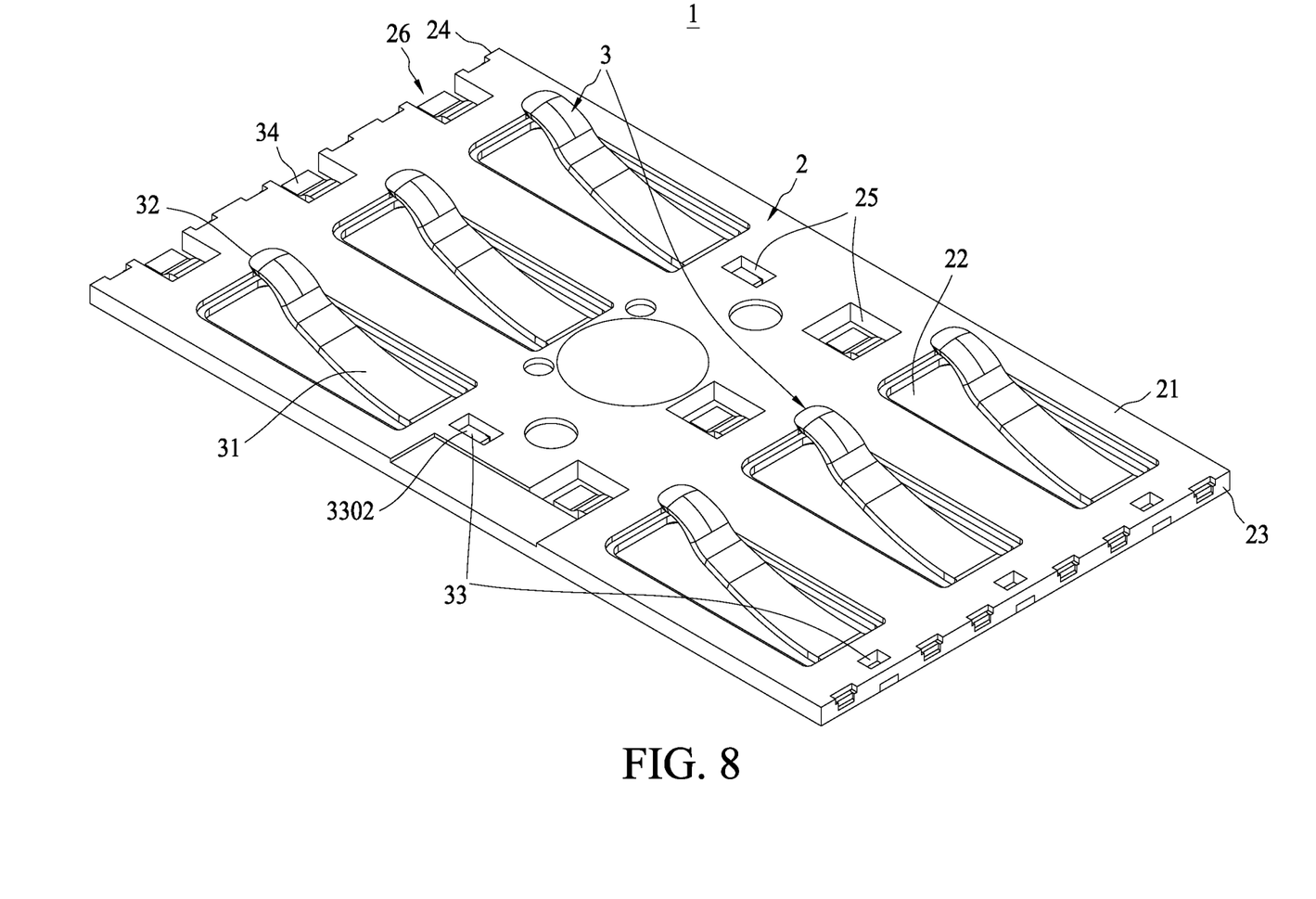
FIG. 8 is a perspective exploded view showing an embodiment of an electronic card connector from above.
Figure 9:
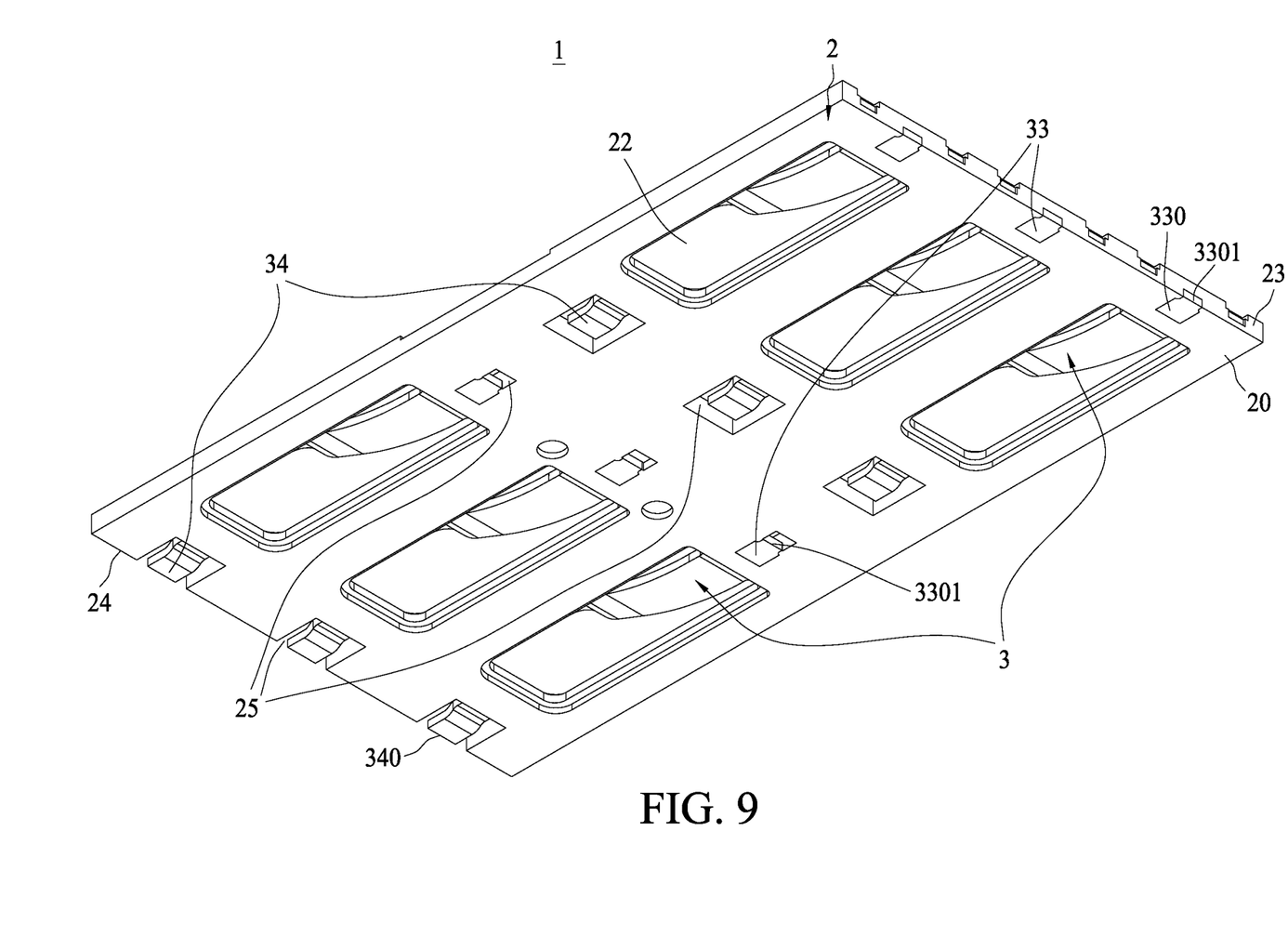
FIG. 9 is a perspective exploded bottom view showing an embodiment of an electronic card connector.

FIG. 8 is a perspective exploded top view showing an electronic card connector 1. FIG. 9 is a perspective exploded bottom view showing an electronic card connector 1. The main portion 302 of each terminal 3 is fixed in the insulating body 2 by insert molding, the spring portion 31 extends upward into the corresponding passageway 22 of the insulating body 2, and the contact portion 32 extends out of the insulating body 2 over the top surface 21.

The spring portion 31 of the terminal 3 directly extends from the main portion 302 with the contact portion 32 is formed in the distal end of the spring portion 31.

One edge of the first soldering portion 33 and the second soldering portion 34 can be exposed so as to allow solder to wick thereon, resulting in increased strength of attachment of the electronic card connector 1 to the PCB 5. In one embodiment, the end edge 3301 of the first soldering portion 33 adjacent to the first end 23 of the insulating body 2 appears on the first end 23 of the insulating body 2.

In addition, openings 25 can be formed on the insulating body 2, disposed in such a way that exposes the first soldering portions 33 and the second soldering portions 34 insert molded in the insulating body 2. Similarly, one edge of the first soldering portion 33 or the second soldering portion 34 is exposed in the corresponding opening 25. In one embodiment, the end edge 3301 and the upper edge 3302 of the first soldering portions 33 are exposed so that solder can wick onto the end edge 3301 and a portion of the upper surface 3302, and the strength of attachment of the electronic card connector 1 to the PCB 5 can be increased.

In one embodiment, all edges and the upper surface of the second soldering portions 34 can be exposed as shown in FIG. 8. Thus, the solderable area of the second soldering portions 34 can be significantly increased such that the electronic card connector 1 can be more firmly secured to the PCB 5.

As shown in FIG. 8, a plurality of notches 26 can be formed on the second end 24 for completely exposing the second soldering portions 34 disposed adjacent to the second end 24. As a result, the solderable area of the second soldering portions 34 can be significantly increased.

Figure 10:
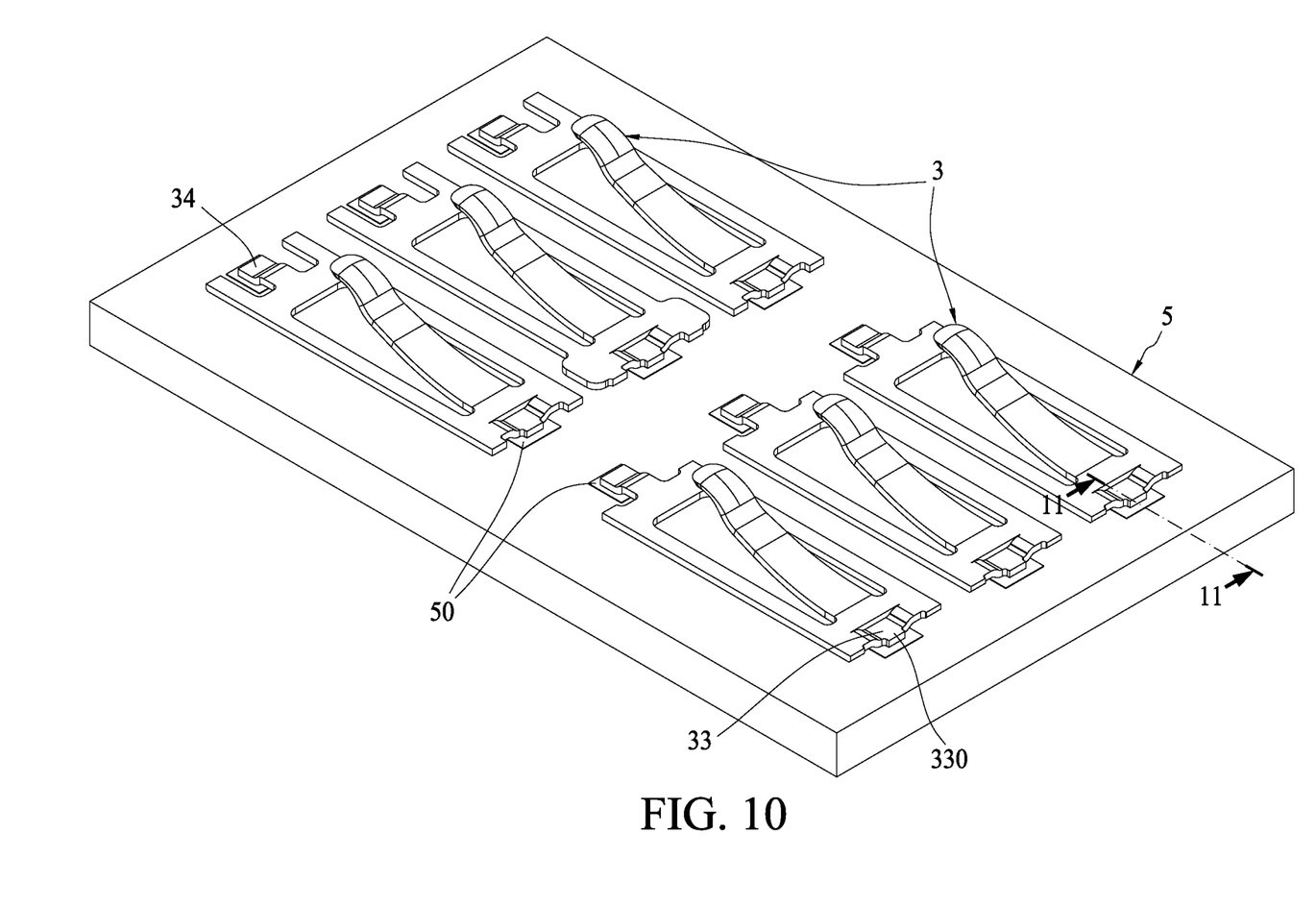
FIG. 10 is a perspective view showing an embodiment of a plurality of terminals of an electronic card connector mounted on a PCB.
Figure 11:
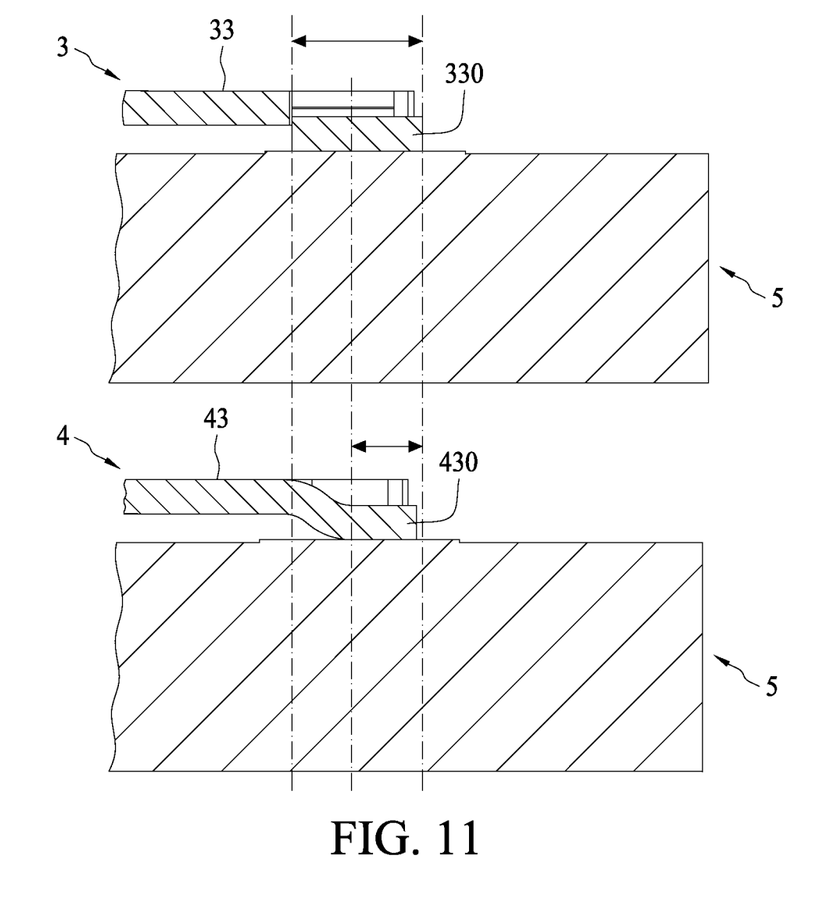
FIG. 11 illustrates a cross-sectional view along line 3-3 of FIG. 8, and a cross-sectional view along line 11-11 of FIG. 10.

FIG. 10 is a perspective view showing a plurality of terminals 3 of an embodiment of an electronic card connector 1 mounted on a PCB 5. FIG. 2 is a perspective view showing a plurality of terminals 4 of an electronic card connector according to a conventional design mounted on a PCB 5. FIG. 11 illustrates a cross-sectional view along line 3-3 of FIG. 10 and a cross-sectional view along line 11-11 of FIG. 9.

The plurality of terminals 3 in the depicted embodiment and the plurality of terminals 4 according to the conventional design are respectively soldered onto a PCB 5. The first soldering portion 33 and second soldering portion 34 of each terminal 3, and the first soldering portion 43 and second soldering portion 44 of the corresponding terminal 4 of the conventional design, are soldered on the same solder pad 50 of the PCB 5. In contrast to the design of terminal 3 depicted in FIG. 10, the first soldering portion 43 of the terminal 4 bends downward and then horizontally extends to form a flat soldering plate 430. According to FIG. 2, because the first soldering portion 43 exhibits inefficient use of space due to bending in the length direction of the electronic connector, the first soldering portion 330 of the present invention must have a soldering plate 330, the only available soldering part, longer than the soldering plate of the first soldering portion 430 of the conventional design. Furthermore, the first soldering portion 43 of the conventional design has a gap 431 with the main portion 302 in each side, so the width of the first soldering portion 43 also is limited and the width of the first soldering portion 43 of the conventional design must be narrower than the width of the first soldering portion 33. Thus, the first soldering portion 33 has an available soldering area larger than that of the conventional design in both length and width.

The illustrated connector has various embodiments, such as those in which the second soldering portion uses the same structure as the first soldering portion, or the second soldering portion extends from the side of the main portion. In one embodiment, the terminals may be formed in the electronic card connector in a way other than by insert molding.

In view of the above, the insulating body and terminals can be arranged in the same area on a PCB to conserve space and reduce the size of the electronic card connector. Although the size of the electronic card connector is small, it can be mounted in a stable manner on a PCB for the two soldering portions, wherein the first soldering portion is formed by directly lancing the base in the first end, which creates an available soldering area larger than that possible under conventional designs in the same space.

The above-described embodiments are intended to be illustrative only. Numerous alternative embodiments may be devised by persons skilled in the art without departing from the scope of the following claims.

What is claimed is:

1. An electronic card connector, comprising:
   an insulating body defining a bottom surface and a top surface opposite to the bottom surface; and
   a plurality of terminals held by the insulating body, each terminal comprising:
   a base comprising a main portion;
   a spring portion extending from the base;
   a contact portion extending from the spring portion and above the top surface of the insulating body;
   a first soldering portion formed by recessing a first end of the base, wherein the first soldering portion and the main portion form a slit therebetween; and
   a second soldering portion separated from the first soldering portion.

2. The electronic card connector of claim 1, wherein the second soldering portion is formed by recessing a second end opposite to the first end of the base, wherein the second soldering portion and the main portion form a slit therebetween.

3. The electronic card connector of claim 1, wherein the second soldering portion extends downward from a second end of the main portion opposite to the first end of the base.

4. The electronic card connector of claim 3, wherein one edge of the first soldering portion is exposed for adhesion of solder.

5. The electronic card connector of claim 4, wherein one edge of the second soldering portion is exposed for adhesion of solder.

6. The electronic card connector of claim 4, wherein the main portion of the base is formed in the insulating body by insert molding.

7. The electronic card connector of claim 6, wherein the main portion of the base includes a window in the middle, and the spring portion extends from an end of the main portion near the first end of the base over the window.

8. The electronic card connector of claim 7, wherein the insulating body defines a passageway through the bottom surface to the top surface corresponding to the window of the main portion, and the spring portion of the terminal extends into the passageway correspondingly.

9. The electronic card connector of claim 8, wherein the bottom surface of the available soldering part of the first soldering portion, the bottom surface of the available soldering part of the second soldering portion, and the bottom surface of the insulating body are substantially coplanar.

10. The electronic card connector of claim 1, wherein an available soldering part of the first soldering portion is a flat soldering plate lanced in the middle.

11. The electronic card connector of claim 2, wherein an available soldering part of the first and second soldering portions is a flat soldering plate lanced in the middle.

12. The electronic card connector of claim 3, wherein an available soldering part of the first soldering portion is a flat soldering plate lanced in the middle, and an available soldering part of the second soldering portion is a flat soldering plate in the free end of the second soldering portion.

13. The electronic card connector of claim 4, wherein the electronic card connector is a SIM card connector.

14. The electronic card connector of claim 1, wherein the first solder portion, the second solder portion and the spring portion are in a row.

* * * * *